No. 883,466. PATENTED MAR. 31, 1908.
L. P. LOWE.
PROCESS OF MAKING GAS AND COKE.
APPLICATION FILED JAN. 30, 1905. RENEWED FEB. 25, 1908.

Witnesses
Inventor
L. P. Lowe
By F. M. Wright,
Attorney

UNITED STATES PATENT OFFICE.

LEON P. LOWE, OF SAN FRANCISCO, CALIFORNIA.

PROCESS OF MAKING GAS AND COKE.

No. 883,466.

Specification of Letters Patent.

Patented March 31, 1908.

Application filed January 30, 1905, Serial No. 243,171. Renewed February 25, 1908. Serial No. 417,704.

*To all whom it may concern:*

Be it known that I, LEON P. LOWE, a citizen of the United States, residing at San Francisco, in the county of San Francisco and State of California, have invented certain new and useful Improvements in Processes of Making Gas and Coke, of which the following is a specification.

This invention relates to an improved process of making gas and coke, the object of the invention being to provide a process of making gas from oil by which coke may also be made at the same time, and which will be more economical than processes heretofore used, by avoiding the discharge of carbonaceous material in the form of smoke, and also by avoiding the rapid disintegration of the refractory material heretofore resulting from contact of oil with said material when in a highly heated condition.

Figure 1:
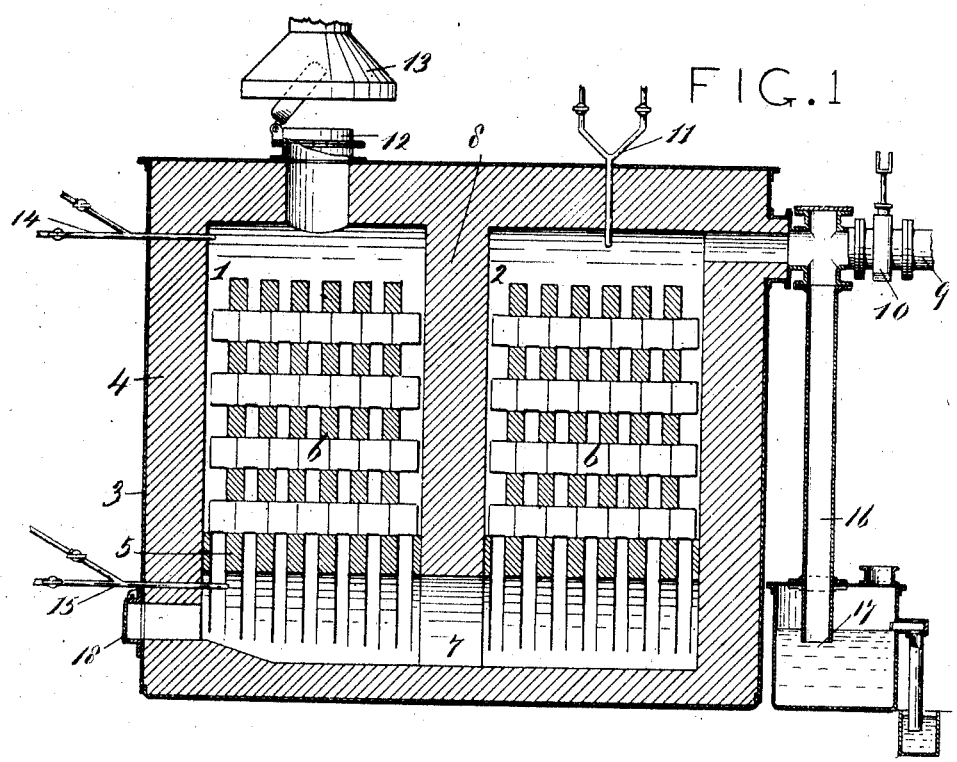
Figure 2:
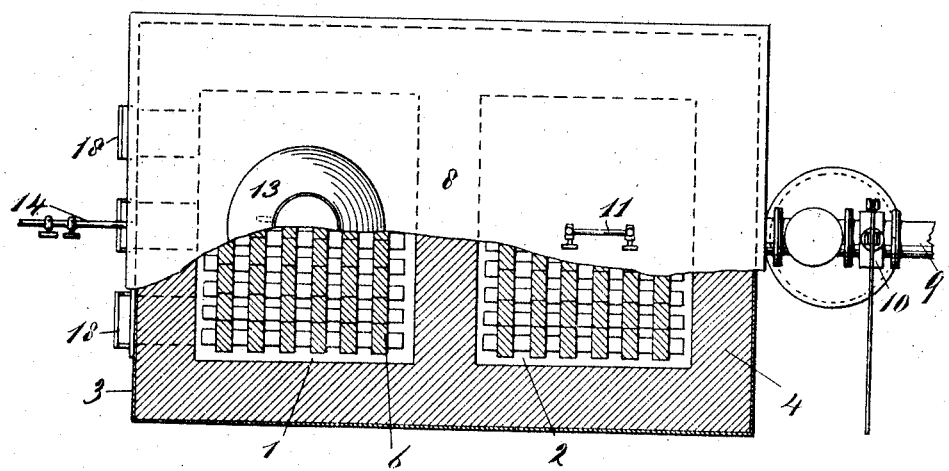

In the accompanying drawing, Figure 1 is a longitudinal vertical section of an apparatus which may be conveniently used for my improved process; Fig. 2 is a broken plan view thereof.

Heretofore in the manufacture of gas from oil, a process has been employed in which oil and air are supplied to a chamber having refractory material loosely piled therein and the oil burned in said chamber, the products of combustion being passed up through said chamber to highly heat the refractory material, then the combustion of the fuel is stopped, steam is supplied to said chamber to superheat the same, and oil is also supplied to said chamber, commingling with the same and effecting the decomposition thereof, and the heat of the refractory material being utilized to form combustible gases from said oil and the superheated steam. In this operation there would be a quantity of residual carbon left from the distillation of the oil, and in the next operation of heating up the refractory material this carbon would be only very slightly consumed and would principally be driven off in the form of smoke. The reason for this waste in the operation was that the carbon residue and the oil vapor were allowed to pass through the chamber in the same direction.

I have discovered that by separating the carbon residue from the oil vapor at the same time that the oil is distilled and conducting the oil vapor in a different direction from the carbon residue, I am enabled to save the latter in the form of coke, and thus not only save a valuable commercial product but also avoid the disagreeable emission of smoke into the atmosphere. Furthermore this is less injurious to the apparatus employed, as the former process was necessarily attended with a deposition of comparatively cool matter upon the highly heated refractory material causing a rapid shrinkage of the same and a correspondingly rapid disintegration thereof. In my present process it is no longer necessary to deposit unduly cool matter upon the highly heated refractory material.

A suitable apparatus for carrying out my improved process is illustrated in the accompanying drawing, in which it is seen that the apparatus is divided into two chambers, 1, 2, surrounded by a casing 3 lined with a refractory material 4, each chamber being provided with arches 5 at the bottom and loosely piled refractory material 6 resting upon said arches, said chambers connecting by an opening 7 at the bottom of a dividing wall 8. Air is admitted to the top of the chamber 2, through a pipe 9, controlled by a valve 10, and oil is also admitted to the top of said chamber by a pipe 11. The oil being burned with the air, the flames pass down through the loosely piled refractory material 6, and through the arches at the bottom of chamber 2, then through the arched passage way 7, between the two chambers, then up through the arches at the bottom of chamber 1, then through the loosely piled refractory material 6 in said second chamber 1 and out through the valve 12 and the stack 13. When the combustion of the fluid fuel has been continued for a sufficient length of time, the air and oil are shut off, the valve 12 is closed, and steam is admitted at the top of the second chamber 1 through a pipe 14, which steam, passing down through the loosely piled refractory material 6 in said second chamber, becomes superheated. To said steam is added, at the bottom of said second chamber, oil from an oil supply pipe 15 directed beneath the arches of said second chamber. The bottoms of the two chambers being closed on all sides except through the arches constitute, in effect, a retort, by which the oil is distilled and coke is formed. Indeed, a retort of the usual form might be introduced at the bottom of these chambers, the oil being injected into this retort, the retort being open at the top to permit the escape of the gas, but such an addition is unnecessary, as it would accomplish nothing more than that obtained by the "retort" of my present construction. The gases distilled from the oil, together with the superheated steam pass into the first chamber through the arches and holes through the refractory material therein, and by the heat of said refractory material and arches become converted into fixed combustible gases, then passing down by the pipe 16 to the seal 17.

By injecting the oil which is to be converted into gas underneath the refractory material instead of on the top thereof, as heretofore, it is insured that the refractory material will not be in direct contact with the oil but only with the vapor arising therefrom, which vapor will have been raised to a sufficiently high temperature not to materially damage the refractory material by causing too rapid shrinkage thereof. Hence said refractory material will last much longer than heretofore. Again there will now be no deposition of coke or other carbonaceous material upon the refractory material, but what is formed will fall to the bottom of the retort, the volatile portions being distilled. Therefore, upon commencing the step of heating up, no carbon will be driven off unconsumed in the form of smoke through the stack. Also this coke falling to the bottom can be scraped out from time to time through a door 18. The solid hydrocarbon will have been perfectly coked, any gaseous components thereof being driven off and consumed during the step of heating the refractory material.

If it is desired to increase the quantity of coke produced, it is only necessary to increase the amount of oil fed into the retort chamber. Or, if desired, coal may be fed into said chamber through the door 18.

I claim:—

The process of making gas and coke which consists in simultaneously highly heating two segregated bodies of loosely piled refractory material and a retort chamber, discontinuing the step of heating, passing steam into contact with one body of refractory material to superheat the steam, passing oil directly into the retort chamber to distil the oil, retaining the non-volatile components of the oil in said chamber in the form of coke, and passing only the steam so superheated and the volatile portion of the oil so distilled together into contact with the second body of refractory material, to make combustible gases, substantially as described.

In witness whereof I have hereunto set my hand in the presence of two subscribing witnesses.

L. P. LOWE.

Witnesses:
 FRANCIS M. WRIGHT.
 BESSIE GORFINKEL.